United States Patent

Horberg, Jr. et al.

[11] 3,767,350

[45] Oct. 23, 1973

[54] BLOW NEEDLE ASSEMBLY

[75] Inventors: Charles Horberg, Jr., Northbrook; Richard K. Shelby, Hinsdale, both of Ill.

[73] Assignee: Monsanto Company, St. Louis, Mo.

[22] Filed: Mar. 24, 1972

[21] Appl. No.: 237,622

[52] U.S. Cl. .......................... 425/387, 425/DIG. 204
[51] Int. Cl. ............................................. B29d 23/03
[58] Field of Search .................. 425/DIG. 204, 387, 425/387 B, 342

[56] References Cited
UNITED STATES PATENTS

| | | | |
|---|---|---|---|
| 2,784,452 | 3/1957 | Ruekberg et al. | 425/298 X |
| 3,310,834 | 3/1967 | Simpson et al. | 425/182 X |
| 3,513,502 | 5/1970 | Chambers | 425/192 |
| 3,538,211 | 11/1970 | Adomaitis | 425/DIG. 204 |

Primary Examiner—Richard B. Lazarus
Attorney—Harold R. Patton et al.

[57] ABSTRACT

A compact blow needle assembly for a partible mold means extractable through the rear of the mold means in a direction away from the mold axis, which includes a detent mechanism within the mold means extending substantially perpendicular to the blow needle which is readily accessible from the exterior thereof for releasably locking the assembly in place in a bore within the mold means. The mechanism is especially applicable where the mold means includes two or more side by side cavities for simultaneously blowing plural articles.

25 Claims, 3 Drawing Figures

PATENTED OCT 23 1973

BLOW NEEDLE ASSEMBLY

BACKGROUND OF THE INVENTION

This invention relates to blow molding and more particularly to blow molding systems utilizing a hollow needle to expand the parison within the blow mold.

Conventional molding machines include a plurality of mold means each of which is made up of opposing mold sections which may be individually mounted on carrier blocks and arranged to rotate about a central axis in either a horizontal, vertical or some intermediate plane. The sections of each mold means when closed on each other define one or more cavities bounded by internal surfaces of the mold sections which are contoured to the general configuration of an article to be molded therein. One of the mold halves may be provided with a bore in which a hollow blow needle is reciprocably mounted for puncturing and then pneumatically expanding a clamped off portion of a tubular parison usually formed in the outlet of an adjacent extruder head. After many molding cycles of such machinery, it frequently becomes necessary to replace a blow needle which may have become blunted or broken, as for example, when the thermoplastic of the parison is rather stiff and difficult to penetrate at molding temperatures, or perhaps one of the surfaces against which the reciprocating blow needle mechanism slides has become worn and requires replacement. In the type of blow molding machine wherein an outer portion of the split mold means moves toward and away from an opposing inner portion in a direction radial to a horizontal shaft carrying arms on which such mold means are mounted, the blow needle mechanism in the past has been located for convenience on the inner, relatively fixed portion of the mold means for simplicity of construction, all as set forth in U.S. Pat. No. 2,784,452. With this and similar types of "wheel" molding machines, it is desirable to mount adjacent mold means units as close as possible to each other in the circumferential direction of rotation of the wheel in order to keep the waste material between adjacent mold means which must be reprocessed at a minimum, and as close as possible to the wheel axis in the radial direction on the individual arms in order to minimize generation of unbalanced forces during rotation of the wheel, which can have adverse stuructural implications on the various machine components. When this type of mounting arrangement is followed, the amount of space in the area adjacent the hub of the wheel for removing the blow needle mechanism from the inner portion of the mold means for any one or more of the previously stated reasons is extremely limited.

Accordingly, in copending application Ser. No. 140,665, filed May 6, 1971, and assigned to the assignee of the present invention, it is proposed to remove the blow needle assembly in the opposite direction, i.e., through the parting face of the blow mold. Though this approach functions well in the intended manner, the piston carrying the blow needle reciprocates in the area adjacent the spot where the needle enters the flash cavity of the mold section. This means that the mold section cannot be cored in this area for circulation of a cooling medium therethrough to set the plastic after it is expanded against the adjacent cavity surface area, and consequently the plastic may not be completely set in that area when the article is ejected from the blow mold. This can extend the blowing cycle or adversely affect the downstream trimming process for removing the waste flash from the article after ejection from the mold.

Though mechanisms for removably positioning blow needles in mold sections are also disclosed in U.S. Pat. Nos. 3,310,834 and 3,513,502, they do not appear to be best suited for a molding environment restricted in terms of available space to manipulate the parts of the needle assembly.

SUMMARY OF THE INVENTION

Accordingly, it is an object of this invention to avoid these prior art deficiencies by providing a novel, compact, quick change blow needle assembly which permits replacing a blow needle or a part of the blow needle piston assembly without removing any of the components of the mold means from their positions on the blow molding machine, and which requires a minimum of clearance at the rear of the mold to accommodate such removal.

Another object of this invention is to provide a simplified blow needle assembly which is self contained within a support block carrying one of the blow mold sections.

A further object of this invention is to provide a novel blow needle assembly which occupies a minimum of space in the mold means in which it is mounted and which is releasably held in place by means readily accessible from the exterior of the mold.

A particular object of this invention is to provide a blow needle assembly of the type described which is readily removable through the rear face of the inner portion of a mold means assembly adjacent the horizontal axis of a vertically rotating wheel having radially extending arms on each of which a mold means assembly is mounted.

A further object of this invention is to provide novel needle assembly mounting means which permits extraction of the blow needle assembly through the rear face of one of the sections of the mold means in which it is installed.

Another object of this invention is to provide novel, compact blow needle assembly retention means especially applicable to a plural cavity blow mold.

Yet an additional object of this invention is to provide such blow needle assembly retention means for a plurality cavity blow mold by means of which individual blow needle assembly units may be selectively released from their operating positions within the mold means.

Other objects of this invention will in part be obvious and will in part appear hereinafter.

These and other objects are accomplished in a molding machine of the type having split mold means carrying a blow needle assembly which includes a housing for a piston supporting a needle for puncturing and expanding clamped off portions of a tubular parison by providing the improvement which comprises a detent mechanism within the mold means accessible from the exterior thereof and extending substantially perpendicular to the needle, said mechanism coacting with a surface of the housing for releasably locking the housing in place within the mold means.

BRIEF DESCRIPTION OF THE DRAWINGS

In describing the overall invention, reference will be made to the accompanying drawings wherein.

DETAILED DESCRIPTION OF THE ILLUSTRATED EMBODIMENT

Figure 1:
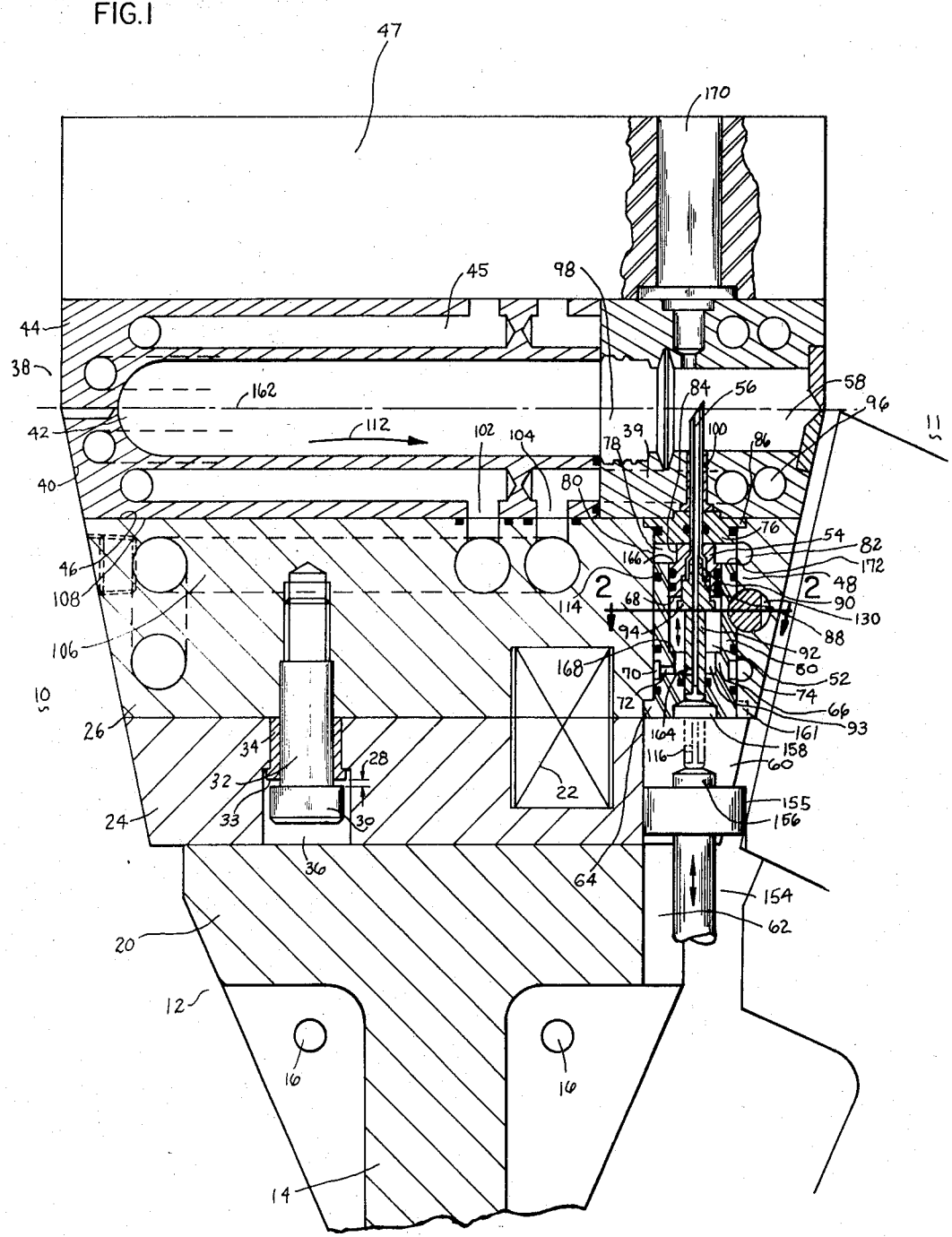
FIG. 1 is a vertical, sectional view of apparatus embodying the present invention.

Referring now to the drawings, there is shown in FIG. 1, one station 10 of a multi-station rotary blow molding machine for forming hollow articles from portions of a continuously extruding thermoplastic parison. Since such extrusion means and thermoplastic parison are conventional to those skilled in the art, as shown in U.S. Pat. No. 2,784,452, they are not shown herein. A station identical to and immediately adjacent station 10 is depicted in outline form as 11 in FIG. 1.

In brief, the blow molding machine of which station 10 is a part comprises a driven, horizontal central shaft carrying a hub to which a large diameter circular plate is welded. A series of elongated spoke-like arms extending radially of the wheel axis are in turn fastened to this circular plate, one arm for each mold station. This structure is relatively conventional as shown in the previously mentioned U.S. Pat. No. 2,784,452 and is not shown in the drawings. A mold spacer casting 12 (FIG. 1) is provided for each mold station 10 and is secured by suitable fastening members through holes 16 to its radial arm, not shown. Casting 12 includes a support rib 14 and outer platform portion 20.

Means may be provided to resiliently support the mold means of each station 10 on the machine, to compensate for any machining descrepancies in the cam arrangement (not shown) for opening and closing the mold. Such means may comprise a series of coil compression springs schematically illustrated as 22 in FIG. 1, situated in opposing cavities in backup plate 24 which is rigidly mounted on platform portion 20 of casting 12, and inner mold section support block 26. With this arrangement, the extent of resilient movement of the inner portion of the mold means, (the latter being shown in closed position in FIG. 1) is defined by 28, which represents the clearance between the underside of head 30 of one of a series of shoulder bolts 32, and the opposite top surface 33 of a surrounding wear bushing 34 situated in cavity 36 in radially stationary backup plate 24. Thus, when the mold means is in open position (not shown), surface 33 of bushing 34 and the underside of head 30 are in abutting relationship as a result of the radially outward forces generated by springs 22, and a clearance will exist between the opposed, adjoining faces of backup plate 24 and inner mold section support block 26, which clearance is eliminated as shown in FIG. 1 when the mold means is in closed position.

Split mold means 38 are provided at each molding station 10 and include inner mold half 40 having molding cavity 42 formed therein opening toward outer mold half 44 — the latter being constructed substantially identical to mold section 40 in the portion defining the main body section of the article being molded. Each mold section 40 and 44 may optionally be formed in two parts, as illustrated in FIG. 1, one part defining the body of the article being molded and another abutting part 39 defining the article finish and waste moile through which the blow air passes in a manner to be described hereafter. Side 46 of inner mold section 40 which is opposite the side in which cavity portion 42 is formed lies against front face 108 of block 26 in supporting contact therewith.

Blow needle assembly 48 is provided for split mold means 38 and includes housing 50 having internal chamber 52 for a piston 54 carrying a hollow needle 56 situated in a narrow bore formed in inner mold section 40, and capable of extending into flash holding portion 58 of cavity 42 to puncture and expand successive clamped off portions of a tubular parison (not shown).

A series of channels 96 are formed in mold section 40 and, as illustrated, these channels can extend well into mold part 39 adjacent the flash holding portion 58 and finish defining section 98 of cavity portion 42. As an important aspect of the invention, the only part of mold section 40 which is occupied by a part of the blow needle assembly 48 is the relatively narrow bore within which bushing 100 is seated, and through which blow needle 56 reciprocates. Thus, no compromise need be made with the cooling capacity of the mold section in order to accommodate means for removably mounting blow needle assembly 48. As is illustrated in FIG. 1, each of the cooling channels typically illustrated as 96 of inner mold section 40 communicate, for example by means of inlet and outlet passages 102 and 104 with supply and discharge cooling channels illustrated as 106 in support block 26. Thus, the cooling medium for each mold station 40 is piped into support block 26 which in turn feeds and discharges from aligned cooling channels 96 in a mold section 40. With this construction, when it is desired to change mold sections 42 and 44 of the mold means 38, for example to form a differently shaped article on the machine, the cooling medium supply and discharge lines need not be disturbed since they are associated with support block 26 which likewise is not disturbed during a mold changeover. The newly installed mold section(s) in turn would have cooling channels formed therein in the same manner as illustrated for section 40 so that such channels would be aligned with the corresponding feed and discharge openings in the channels 106 in support block 26. In this way machine down time for mold changeover is minimized.

As illustrated, outer mold section 44 of mold means 38 may be provided with cooling channels 45 and mounted on a separate outer mold section in support block 47 similarly to that for inner section 40.

Blow needle assembly 48 in the illustrated embodiment is situated within a vertical cylindrical bore formed in and extending fully through support block 26, one end of such bore opening to rear side 46 of mold section 40 and the other end being open to the surrounding atmosphere. To allow for removal of the various components of assembly 48 through the rear end of the bore in support block 26, it may be necessary to machine away minor end portions of backup plate 24 and platform portion 20 of mold spacer casting 12 to form cutout sections 60 and 62 therein which act as extensions of the cylindrical bore in support block 26.

Means are provided at the rear ends of housing 50 of blow needle assembly 48 and the bore in support block 26 in which it is confined for delimiting the forwardmost position of housing 50 in said bore. In the illustrated embodiment, such means comprise an enlargement 64 formed on housing 50 which seats in an opposite depression in a portion of the bore defining surface in block 26 in the manner generally indicated in FIG. 1. Housing 50 also has internal step 66 at the rear end of internal chamber 52 which delimits rearward movement of piston 54 when surface 68 thereof abuts against the opposite horizontal surface of step 66. Peripherally extending slot 70 is formed in the outer surface of housing 50 adjacent its rear end which communicates by means of horizontal extension 72 with internal chamber 52 of housing 50 on one side and on the other side with fluid passage 74 formed in support block 26. Also, when enlargement 64 is seated within the opposite depression in block 26 in the manner illustrated in FIG. 1, the forward end of housing 50 is spaced from stop member 76 so as to form channel 78 with surface 80 of the bore in support block 26, which in turn communicates with a second fluid passage 82 in block 26. The inner surface of channel 78 is defined by cylindrical surface 84 of piston 54 when the latter is in its forwardmost position in the bore of block 26, as illustrated in FIG. 1.

Stop member 76 has an annular projection 86 thereon for cooperating with an opposing depression in the surface of the bore to define a seat for member 76 in the forwardmost end of the bore. Stop member 76 serves to delimit the advancing movement of piston 54 in housing 50 by acting as an abutment for the former when it is propelled toward cavity 42 in a manner to be described. Stop member 76 has a central cylindrical passage extending through it which is in alignment with a corresponding extension thereof in mold section 40 when member 76 is in seated position and through which needle 56 reciprocates during functioning of the blow needle assembly.

Hollow blow needle 56, is preferably formed of a ductile metal with a flared rear end portion 88 which is press fit into place between a tapered surface portion of a cavity formed in piston 54 and an opposing matching surface of a nose portion 90 on hollow piston rod 92 which fits within the cavity in piston 54 and extends rearwardly thereof. Means are provided on rod 92 for forcing nose portion 90 into the cavity in piston 54 with flared end portion 88 of hollow needle 56 situated therebetween so as to deform the ductile metal of needle 56 outwardly between nose portion 90 and the opposing surface of the cavity and thus frictionally engage flared end 88 between the two mating parts. In the illustrated embodiment, these means comprise an enlargement 94 formed on rod 92 which may be in the form of a multi-sided head so as to be compatible with a wrench to assist in advancing hose portion 92 into flared end 88 in the just described manner. Thus, to remove a needle from its position within piston 54 after blow needle assembly 48 has been removed from its position in the bore in the support block, it is merely necessary to back rod 92 off with a quick turn of a wrench applied on enlargement 94 so as to release needle 56 from its position thereon. A second or new needle is then dropped into place through the axial bore in piston 54 with its flared end 88 to the rear. Rod member 92 is then forced into this flared end of the new needle such that it is forced outwardly into frictional engagement with the surface of nose portion 90 and the opposite surface of the cavity formed in piston 54.

O-ring seals typically illustrated at 114 in FIG. 1 may be provided between the various sliding parts of assembly 48 and surface portions of the bore in which it is situated.

As an important feature of the present invention, means are provided for releasibly locking housing 50, and consequently the remaining portions of blow needle assembly 48 within housing 50, in place in the confining bore in support block 26 of mold means 38. These means comprise a detent mechanism generally indicated as 118 in FIG. 2 within mold means 38 accessable from the exterior thereof and extending substantially perpendicular to needle 56. A crosswise bore 119 extends fully through block 26 of mold means 38 at right angles to the vertical bore within which blow needle assembly 48 is confined, and an elongated cylindrical rod 120 is positioned therein. Means 132 comprising compression spring 134 between collar 136 seated against a shoulder in bore 119 and securing nut 138 threaded on the end of rod 120 releasably biases rod 120 to the rear in the direction of arrow 140 in FIG. 2 so as to draw collar 122 against face 126 of support block 26. Collar 122 is fastened on one end of rod 120 by means of pin 150 and extends outwardly of vertical face 126 of support block 26. Collar 122 may have a knob 128 thereon with a knurled surface to aid in rotating shaft 120. It should be realized that face 126 of block 26 extends vertically of the axis of the blow molding machine at each mold station and consequently any part protruding therefrom, such as a knob 129, is readily accessible in comparison with the relatively confined area at right angles to face 126 adjacent the axis of the molding machine i.e., in clearances 60 and 62 in FIG. 1. Rod 120 when in place in bore 119 has a flat portion 130 milled in its surface which intersects the vertical bore within which housing 50 is confined in the manner illustrated in FIG. 2. Housing 50 of assembly 48 in turn has a matching slot or flat 128 formed on its outer surface adapted to line up opposite that in rod 120 when the latter is in position in bore 119. Thus, when it is desired to release blow needle assembly 48 from its self contained position in the vertical confining bore in support block 26, freely accessible knob 128 is merely rotated such that flat surface 130 on rod 120 lines up with the opposite flat surface 129 on the outside of housing 50, whereupon housing 50, piston 54, rod member 92 and attached hollow needle 56 are free to fall out of support block 26 through cutout portions 60 and 62 in backup plate 24 and platform portion 20 respectively into the hand of an operator. No further dismantling of the piston and housing is necessary in order to expose the needle to be replaced. Rod 92 is merely backed out of its position within the piston, a new needle dropped into place and the rod forced against the piston by means of projection 94, the piston inserted within the housing and the housing inserted within the vertical bore in the support block in order to complete reassembly. In similar manner, a piston, or for that matter a new housing, may be readily replaced. After the housing is again situated within its vertical confining bore in block 26, knob 128 is turned so that a portion of the cylindrical surface of rod 120 is situated within the flat 128 on housing 50 to securely fix the housing in place within the support block. In this manner, it should be noted, that a blow needle assembly 48 may be replaced without in any way disturbing the mold section 40 within which it is operable, stop member 76 remaining in place because of the way in which it is seated within the bore by means of projection 86 thereon.

Figure 2:
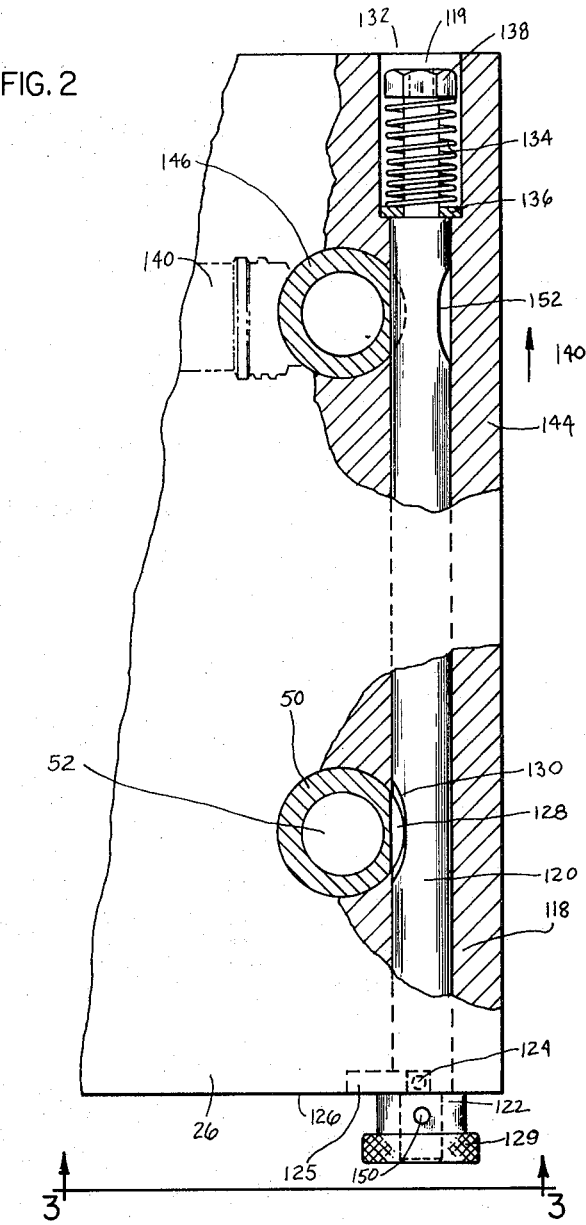
FIG. 2 is a partial, sectional view along 2—2 of FIG. 1 illustrating apparatus portions of FIG. 1 ready to be released from assembled position.
Figure 3:
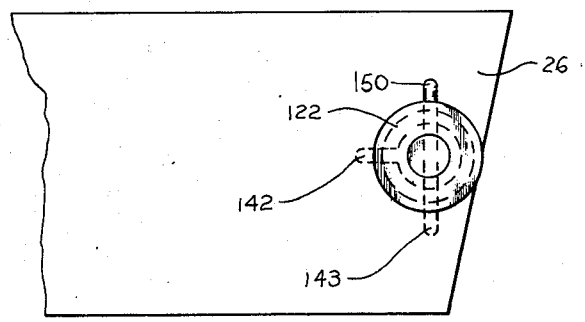
FIG. 3 is a front view along 3—3 of FIG. 2.

As another feature of the invention, a second mold cavity schematically illustrated in part as 140 in FIG. 2, may be provided as part of the single mold means 38, cavity 140 being situated adjacent to and extending parallel with cavity portion 42. A second blow needle assembly constructed exactly the same as that for the just described assembly 48 may be provided in a second vertical confining bore in support block 26. With such construction, detent mechanism 118 is extended so as to also function with the second assembly by providing a portion generally indicated as 144 for cooperation with second housing 146 in the same manner as previously described for assembly 48. With such construction, pin 150 can be used as an indicator of the position of flat surfaces 130 and 152 of rod 120 with respect to the corresponding opposed flat surfaces on housing 50 and 146 respectively situated within block 26. By misaligning flat surface portions 130 and 152 on rod 120 as indicated in FIG. 2, one or the other of housings 50 and 146 may be preferentially released from confinement within the support block. Thus, by turning knob 129 to the position illustrated in FIG. 2, in which pin 150 is projecting vertically upward, the front housing 50 is in its release position, whereas housing 146 is still locked in place. By rotating knob 129 90 degrees to the left from the position shown in FIG. 2, as illustrated at 142, both housings 50 and 146 are locked in place, whereas further rotation through an additional 90° to position 143 will place rear housing 146 in release position while front housing 50 will still be locked in place. Thus, one or the other of housings 50 and 146 may be selectively released from their positions within the vertical bores of support block 26. Suitable indicator markings may be formed on face 126 of block 26 to indicate the positions of the various parts. Pin 124 on the surface of rod 120 is movable within end milled slot 125 in block 26 to limit rotation of rod 120° to 180°.

As yet another feature of the invention, a loading fixture 154 may be provided to aid in inserting a blow needle assembly in its vertical bore in support block. Such a loading fixture may be desirable since cut out portions 60 and 62 at the rear of the mold means through which the assembly must pass as it is being inserted in the block, as mentioned, are relatively inaccessible, and it is necessary that the slot portion of the cylindrical housing be in proper circumferential position in order that it may line up with the opposed matching flat on the outer surface of the rod of the detent mechanism, or otherwise the needle assembly cannot assume its fully seated position within the vertical bore. Such aligning might be especially difficult when the inner mold section 40 is not to be disturbed during replacement of a blow needle. Loading fixture 154 has means thereon for cooperating with the rear end of a housing 50 to facilitate insertion of the latter into its vertical bore in the support block. Such means in the illustrated embodiment comprise a head portion 155 at the top of fixture 154 with a protruding boss 156 thereon having a diameter such that it may be frictionally engaged in recess 158 in the base of each housing 50. Means may further be provided on housing 50 and a surface portion of the vertical bore in which the housing is to be mounted for orienting slot 128 with respect to the opposite flat surface on rod 120 of the detent mechanism. These orienting means in the illustrated embodiment comprise a projection or lug 161 on the surface of the annular depression at the rear end of the vertical bore in block 26 designed to fit within a matching U-shaped slot or notch in enlargement 64 of housing 50. Thus, to insert an assembly 48 in the confining bore of block 26, boss 156 of fixture 154 is frictionally engaged in recess 158 of housing 50. The housing mounted on the fixture is then inserted into the vertical bore in the support block and the fixture rotated until projection 161 seats in the opposing U-shaped notch in enlargement 64. This then means that the flat surface 130 on the rod is lined up opposite the slot or flat surface on the housing, and that the housing is in its fully advanced position within the bore. Knob 129 is then turned to bring a cylindrical portion of rod 120 within the slot and accordingly lock housing 50 in place.

In operation, a portion of an extruding parison (not shown) is positioned between opposing inner and outer mold sections 40 and 44 of mold means 38 while such sections are separated from each other about mold parting line 162. The outer portion of mold means 38 is then caused to close on the inner portion to assume the position illustrated in FIG. 1 with the parison portion clamped therebetween, all in a generally known manner as described in U.S. Pat. No. 2,784,452. As mold station 10 continues its peripheral movement in the direction of arrow 112 (FIG. 1) around the molding machine, the clamped off parison portion is expanded outwardly against the surfaces of the mold cavity to form, in the illustrated embodiment, an elongated tubular article.

With respect to blow needle assembly 48 by means of which such expansion is accomplished, hollow needle 56 is initially in its retracted position, as illustrated by the phantom lines 116 in FIG. 1 while the parison portion is being clamped in place between the opposing mold sections. After this is accomplished, pressured air from a suitable source and by means of suitable valving well known to those skilled in the art and not shown, is admitted through passage 74 in support block 26, slot 70 and extension 72 in housing 50 and then against the underside or rear face 68 of piston 54 so as to cause the latter to advance in cavity 52 of housing 50. At this point, air cannot enter the hollow interior of needle 56 since corss passage 164 is still rearward of extension 72 in the housing. Such advancing movement of piston 54 will cause the sharp leading end of needle 56 to penetrate the wall of the clamped parison and to eventually assume the position illustrated in FIG. 1. At this point, cross passage 164 is aligned opposite extension 72 and pressurized air accordingly can enter the hollow interior of needle 56 and eventually exit into the cavity of the blow mold to expand the parison portion outwardly to form the article. By delaying introduction of the expanding air into the clamped parison in this manner, penetration is initially carried out before expansion. Thus, collapse of the wall of the parison towards the mold parting line as a result of air pressure acting against it is avoided, which would otherwise occur if the air were allowed to flow into the interior of the needle at the same time the latter was attempting to penetrate the parison wall. After the plastic of the formed article has been set by the cooling medium flowing through channels 45 and 96 in the mold sections, the valving associated with passage 74 in support block 26 is actuated so as to terminate the flow of air into the mold and to vent passage 74 to atmosphere. This will allow the air within the mold cavity to flow back through the blow needle and out through passage 164, extension 72 and slot 70 to the atmosphere as long as passage 164 is open to extension 72. However, under the influence of the pressure within the mold, needle 56 should recede rearwardly to the position illustrated by phantom lines 116, and since the areas 60 and 62 are likewise open to the atmosphere, venting of the mold will continue. Such rearward movement of the needle may be facilitated by introducing air by suitable valving (not shown) into passage 82 in block 26 and channel 78 so as to act against surface 166 which is the horizontal portion of a step formed in the leading end of piston 54, thus driving the latter to the rear until surface 68 abuts against surface 168 of internal step 66 of housing 50. When this occurs, enlargement 94 on rod 92 is preferably suspended within pocket 93 in chamber 52, since if rearward movement were interrupted by bottoming out on enlargement 94, the friction fit of the needle within the piston might undesirably be loosened and the needle could be prematurely released from its association with the piston. The mold means 38 may then be opened and the article ejected from the molding cavity by suitable conventional knockout means associated with channel 170 in the outer section 44 of the mold means in a conventional manner, not shown but well known to those skilled in the art. Mold station 10 is then rotated beneath the extrusion nozzle to accept the next parison portion to commence a new cycle.

It should be noted that after the detent mechanism 118 is aligned in the manner previously described to allow ejection of a blow needle assembly 48 from its position within the support block, that such ejection can be aided by admitting quick blasts of pressurized air through second passage 82 in block 26 so as to act against ledge 172 of the unlocked housing 50, and thus project it to the rear and out of the vertical bore.

The above description and particularly the drawings are set forth for purposes of illustration only and are not to be taken in a limited sense.

Various modifications and alterations will be readily suggested to persons skilled in the art. It is intended, therefore, that the foregoing be considered as exemplary only and that the scope of the invention be ascertained from the following claims.

What is claimed is:

1. A molding machine of the type having split mold means carrying a blow needle assembly which includes a cylindrical housing mounted in a bore in the mold means having an internal chamber for a piston carrying a needle for puncturing and expanding clamped off portions of a tubular parison wherein the improvement comprises a cylindrical detent mechanism for releasably locking said housing in place within the bore, said mechanism extending into the mold means substantially perpendicular to said needle and being accessible from the exterior thereof, a portion of the cylindrical surface of said mechanism lying within a slot in the surface of said housing when said housing is locked within the bore, said cylindrical detent mechanism having a flat surface for cooperating with said slot to permit ejection of the housing from the bore when the detent mechanism is in the housing release position.

2. The apparatus of claim 1 including opposing means at the rear end of the housing and bore for limiting the forwardmost position of the housing in the bore.

3. The apparatus of claim 1 wherein said housing has a peripherally extending slot in its outer surface communicating through the wall of the housing with the internal chamber and with a fluid passage in said mold means.

4. The apparatus of claim wherein the needle is formed of a ductile metal and has a flared end portion press fit between a tapered surface of a cavity formed in the piston and an opposing matching surface of a nose portion of a hollow rod extending from the piston.

5. The apparatus of claim 1 including a loading fixture having means thereon for cooperating with the housing to facilitate insertion of the housing into the bore.

6. The apparatus of claim 1 wherein said split mold means carries a second blow needle assembly substantially identical to and mounted parallel to said first mentioned blow needle assembly, said detent mechanism having a second cylindrical surface portion and flat surface for cooperating with the housing of the second assembly in the same manner as said first mentioned cylindrical surface portion and slot.

7. The apparatus of claim 2 including a stop member at the forwardmost end of the bore for delimiting advancing movement of the piston in the housing.

8. The apparatus of claim 2 including a step at the rear end of the internal chamber delimiting rearward movement of the piston in the housing.

9. The apparatus of claim 2 wherein the housing and stop member are spaced apart within the bore to form a channel with the surface of the bore communicating with another fluid passage in the mold means.

10. The apparatus of claim 4 including means on the rod for forcing the nose into the cavity with the flared end portion of the needle therebetween.

11. The apparatus of claim 5 wherein said means for cooperating with the housing is a head portion at the top of the fixture having a boss thereon adapted to be received in a recess in the base of the housing.

12. The apparatus of claim 9 wherein the piston has a step in its forward end facing and defining the inner surface of said channel when the piston is in its forwardmost position in the chamber.

13. The apparatus of claim 11 including means on said housing and surface of the bore for orienting the slot on the housing with respect to the flat surface of the detent mechanism.

14. The apparatus of claim 13 wherein said orienting means comprises a matching lug and U-shaped notch.

15. A molding machine of the type having split mold means which includes a mold half having a molding cavity formed therein opening through one side of said half, a flat block in supporting contact with the side opposite said one side of the mold half and a blow needle assembly which includes a housing having an internal chamber for a piston carrying a needle extending through said mold half for puncturing and expanding clamped off portions of a tubular parison within said molding cavity wherein the improvement comprises a bore in said block entirely containing said housing and an elongated detent mechanism extending through a substantial portion of said block in a direction perpendicular to said needle and being accessible from the exterior thereof, said mechanism coacting with a surface of said housing for releasably locking said housing in place within said block.

16. The apparatus of claim 15 wherein said mold half includes a second molding cavity situated adjacent and parallel to said first mentioned cavity and including a second blow needle assembly in said block for said second cavity, said detent mechanism having a portion thereof which cooperates with the housing of said second assembly in the same manner as for the housing of said first mentioned assembly.

17. The apparatus of claim 15 including a stop member seated in the block at the forward end of the core containing the housing, said stop member having an axially extending passage formed therein through which said needle reciprocates.

18. The apparatus of claim 15 wherein said mold half is formed in two sections.

19. The apparatus of claim 15 including a loading fixture for said housings having means thereon for cooperation with said housings to facilitate insertion into the bores in the flat block.

20. The apparatus of claim 15 wherein the bore in the block containing the housings is open to atmosphere at the end remote from the mold half.

21. The apparatus of claim 15 including channels in said mold half immediately adjacent the area through which the needle enters the mold cavity.

22. The apparatus of claim 16 wherein said detent mechanism comprises a cylindrical rod situated within a bore extending through said block at 90 degrees to and intersecting the bores containing said housings.

23. The apparatus of claim 16 wherein said rod has non-aligned flat surfaces formed thereon at the points where said rod containing bore intersects the housing containing bores.

24. The apparatus of claim 23 including means coacting with a surface portion of said rod containing bore for resiliently holding said rod therein.

25. The apparatus of claim 24 including means outside of said block connected to one end of said rod for indicating the position of said surfaces with respect to the coacting housing surfaces within the block.

* * * * *

PO-1050
(5/69)

UNITED STATES PATENT OFFICE
CERTIFICATE OF CORRECTION

Patent No. 3,767,350        Dated  October 23, 1973

Inventor(s) Charles Horberg, Jr. and Richard K. Shelby

It is certified that error appears in the above-identified patent and that said Letters Patent are hereby corrected as shown below:

Column 8, line 45, after "since" delete "corss" and insert - - - cross - - -.

Column 10, in Claim 4, after "claim" insert - - - 1 - - -.

Signed and sealed this 5th day of March 1974.

(SEAL)
Attest:

EDWARD M. FLETCHER, JR.        C. MARSHALL DANN
Attesting Officer              Commissioner of Patents